(No Model.)
G. LINDENTHAL.
PROCESS OF MAKING STEEL.
No. 465,672. Patented Dec. 22, 1891.
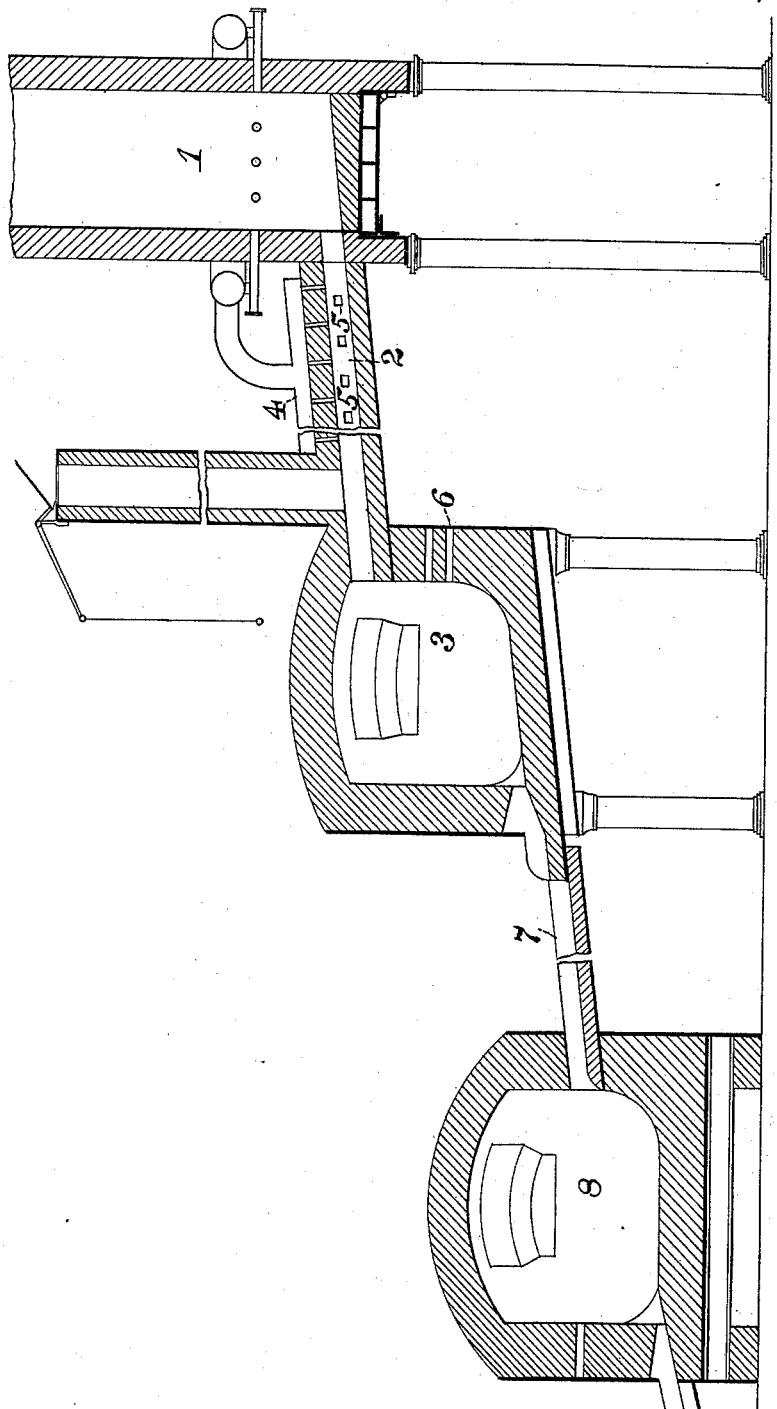
WITNESSES:
Darwin C. Wolcott
F. E. Gaither
INVENTOR,
Gustav Lindenthal,
by George H. Christy
Att'y.

UNITED STATES PATENT OFFICE.

GUSTAV LINDENTHAL, OF PITTSBURG, PENNSYLVANIA.

PROCESS OF MAKING STEEL.

SPECIFICATION forming part of Letters Patent No. 465,672, dated December 22, 1891.

Application filed January 27, 1890. Serial No. 338,192. (No specimens.)

*To all whom it may concern:*

Be it known that I, GUSTAV LINDENTHAL, a citizen of the United States, residing at Pittsburg, in the county of Allegheny and State of Pennsylvania, have invented or discovered a certain new and useful Improvement in the Process of Making Steel, of which improvement the following is a specification.

The invention described herein relates to certain improvements in the manufacture of iron and steel, whereby a dephosphorization of the metal may be effected. A more or less complete elimination of the phosphorus is effected in the present open-hearth practice by lining the furnace with some basic material, as dolomite or magnesite, or with iron ore, or by the addition of such materials to the bath; but on account of the greater affinity of phosphorus for iron the carbon and silicon are first eliminated, the latter forming in its oxidation silicic acid, which, combining partly with the basic material and partly with the iron, enters the slag. During the oxidation of the carbon and silicon the temperature of the bath is greatly increased, thereby increasing the affinity between the phosphorus and iron and rendering the elimination of the former more difficult; and, further, the oxidation of the silicon and the consequent combination of the silicic acid with the basic material and iron causes a considerable waste of both without any corresponding benefit to the bath. A partial elimination of the carbon and silicon is effected during the melting of the pig-iron; but a greater elimination or oxidation is effected after the iron is melted and produces the wasteful results above referred to.

In the accompanying drawing, forming a part of this specification, is shown in sectional elevation an arrangement of plant for the practice of my invention.

In the practice of my invention the iron is melted in the cupola-furnace 1 or any other form of melting-furnace suitable for the purpose, and flows from the tap-hole of such furnace down along the closed conduit 2 to the tank-furnace 3. A shell or casing 4 is placed around or partially around the conduit, and through the walls of the latter are formed perforations 5, through which small jets of cold air are directed upon or through the molten metal. It is preferred, however, to treat the metal as described in application Serial No. 332,781, filed December 6, 1889, wherein the molten metal flows in a comparatively thin stream along the bottom of the conduit and the streams or jets of air are caused to impinge upon the surface of the moving metal, effecting an oxidation of the carbon, silicon, and other impurities. The contact of the cold air upon the surface of the metal will counteract to a considerable extent the heating effect of the combustion of the carbon, silicon, and other impurities, and, further, by confining the combustion or oxidation of the carbon, silicon, &c., to the surface of the metal less heat will be generated within the metal flowing along the conduit, and hence the metal is kept at a temperature at which the separation of the phosphorus is more easily affected, the affinity of phosphorus and iron being less at low temperatures than at high. The slag formed during this elimination of the impurities passes, with the purified metal, into the tank-furnace 3, which is provided with tap-holes 6 for the removal of the slag and its contained impurities.

The furnace 3 may be a furnace of the regenerative or any other suitable type, wherein the metal may be maintained at the desired degree of fluidity. The refined metal is conducted by a trough 7 from the tank-furnace 3 to the open-hearth furnace 8, having a basic lining—*e. g.*, magnesite or dolomite—or a neutral lining of chrome iron ore. Scrap or pig iron or other metal may be charged into the bath either before or after running in the refined metal. Pure iron ore, preferably hematite in lumps about the size of eggs, is thrown into the bath, and, if desired, mill-cinder or other fusible iron oxides or dolomite, or both, in suitable quantities may be added with the iron ore. The quantity of iron ore added may vary from forty to one hundred pounds per ton of refined metal run in. The reduction of the temperature of the bath effected in melting the ore and other additions facilitates the elimination of the phosphorus, the affinity of iron and phosphorus decreasing with the temperature, and as the ore is melted it rises to the surface of the bath and forms a protecting-covering therefor as against oxidation and burning by the impinging flame. By combination with the oxygen the phosphorus is changed to phosphate of iron, which passes into the slag, and any silicon remaining in the bath is also removed by the action of ore or mill-cinder. The process may be prolonged, thereby effecting a more complete dephosphorization by the addition of iron ore, mill-cinder, and some lime or dolomite for the purpose of more completely fluxing the slag.

As the silicon is more or less completely eliminated from the bath prior to its being charged into the furnace having the basic lining, the latter is very slightly attacked and its durability consequently greatly increased.

While my process can be practiced with good results in a furnace having a bottom of iron ore, I prefer to use a basic lining, for the reason that the most refractory ores will melt in the bath, and being continuously disseminated therethrough is liable to produce red shortness.

After the dephosphorization of the bath ferro-manganese and spiegeleisen are added, as usual in the open-hearth process.

I claim herein as my invention—

1. As an improvement in the art of manufacturing steel, the method herein described, consisting in melting the pig-iron in a cupola or other furnace, eliminating the silicon and carbon by causing currents or jets of cold air to pass along and through the molten metal while passing along a closed conduit, whereby the metal in the conduit is maintained at a comparatively low temperature, collecting the metal thus treated in a tank or furnace and separating the slag therefrom, charging the refined metal into an open-hearth furnace having a basic or neutral lining, eliminating the phosphorus by adding a suitable dephosphorizing material to the bath, and finally adding spiegeleisen and ferro-manganese, as in the usual open-hearth practice, substantially as set forth.

2. As an improvement in the art of manufacturing steel, the method herein described, consisting in melting the pig-iron in a cupola or other furnace, eliminating the silicon and carbon by causing currents or jets of cold air to impinge the surface of the molten metal while passing along a closed conduit, whereby the metal in the conduit is maintained at a comparatively low temperature, collecting the metal thus treated in a tank or furnace, separating the slag therefrom, charging the refined metal into an open-hearth furnace having a basic or neutral lining, eliminating the phosphorus by adding iron ore or other fusible oxides of iron to the bath, and finally adding spiegeleisen and ferro-manganese to the bath, as in the usual open-hearth practice, substantially as set forth.

In testimony whereof I have hereunto set my hand.

G. LINDENTHAL.

Witnesses:
R. H. WHITTLESEY,
DARWIN S. WOLCOTT.